(12) United States Patent
Peters

(10) Patent No.: US 6,538,676 B1
(45) Date of Patent: Mar. 25, 2003

(54) VIDEO TOKEN TRACKING SYSTEM FOR OVERLAY OF METADATA UPON VIDEO DATA

(75) Inventor: Geoffrey W. Peters, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/411,197

(22) Filed: Oct. 4, 1999

(51) Int. Cl.[7] .............................................. G06T 11/60
(52) U.S. Cl. ..................................... 345/863; 382/103
(58) Field of Search ............................... 345/326, 358, 345/435, 700, 762, 863

(56) References Cited

U.S. PATENT DOCUMENTS 5,761,678 A * 6/1998 Bendert et al. ............. 707/204
6,157,396 A * 12/2000 Margulis et al. ............ 345/506

OTHER PUBLICATIONS

"Representation and Recognition of Action Using Temporal Templates, " IEEE Conference on Computer Vision and Pattern Recognition (CVPR'97), J. Davis and A. Bobick.

"Virtual PAT: A Virtual Personal Aerobics Trainer," MIT Media Lab, J. Davis and A. Bobick.

"Real-Time Hand Tracking and Gesture Recognition Using Smart Snakes" –Tony Heap and Ferdinando Samaria of Olivetti Research Limited.

"A Generic System for Image interpretation using Flexible templates", A.F. Hill, T.F. Cootes, and C.J. Taylor, Proc. British Machine Vision Conference.

"Local Correlation measures for motion analysis: a comparative study." P.J. Burt, C. Yen, and X. Xu, IEEE CPRIP.

* cited by examiner

Primary Examiner—Matthew C. Bella
Assistant Examiner—G. F. Cunningham
(74) Attorney, Agent, or Firm—Kenyon & Kenyon

(57) ABSTRACT

An interactive metadata selection system includes a token tracker that identifies and determines a coordinate of a token included in input video data. A video mapper receives output video data and determines a display domain coordinate system therefrom. A coordinate mapper resolves the token's coordinates to the display domain. Based on the token's display-domain coordinates, an overlay module selects metadata to be output.

16 Claims, 2 Drawing Sheets

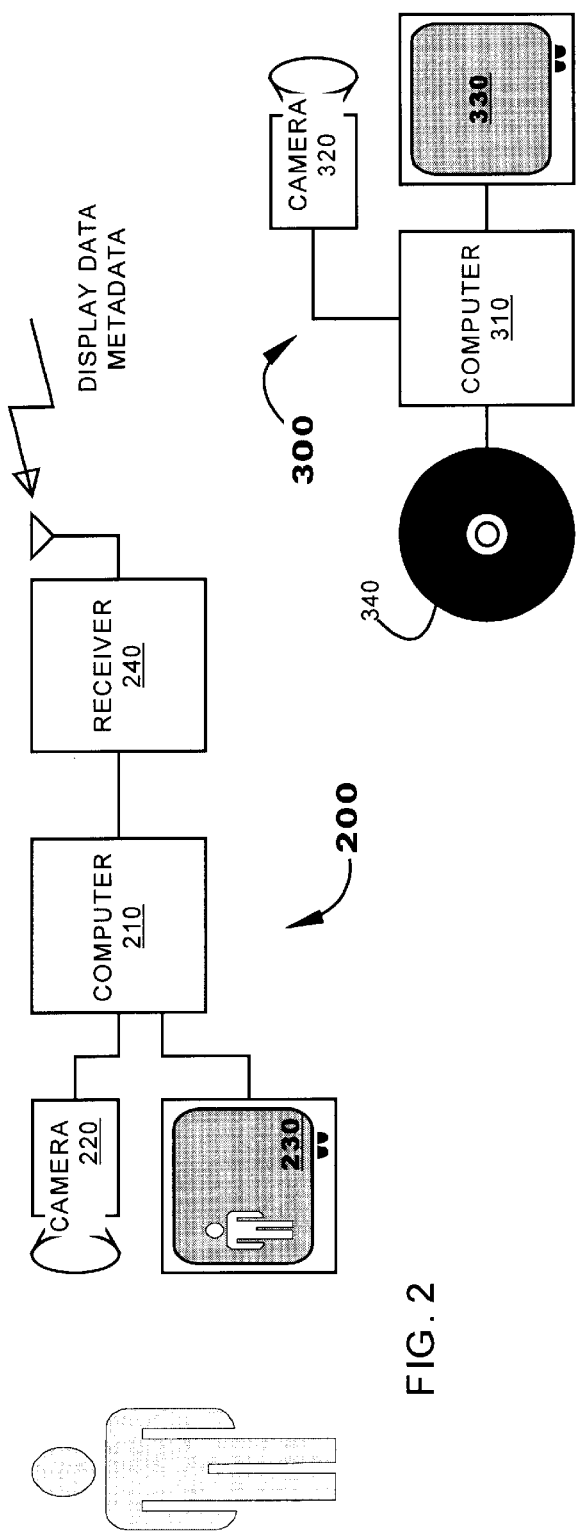
FIG. 2
FIG. 3
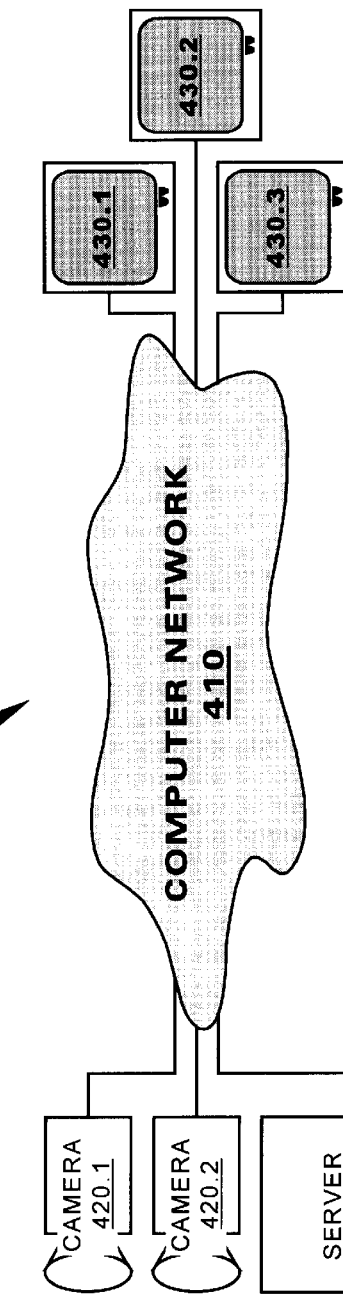
FIG. 4

VIDEO TOKEN TRACKING SYSTEM FOR OVERLAY OF METADATA UPON VIDEO DATA

BACKGROUND

The present invention relates to a video tracking and overlay system controlled by video input.

Input devices for computing systems have not been investigated to the same degree as output devices. In many ways, the traditional keyboard from decades ago remains the primary means of entering user input into a computer. The advent of the mouse, joystick and touch-screens has augmented keyboard input but still the vast majority of input data to the computer is done by keyboard. All of these devices are disadvantageous because they define only a limited set of input data that can be entered into the computer. The input is tied to a predetermined syntactic context. For example, a modern computer keyboard may include 101 keys. These keys may be used only in a finite number of combinations thus limiting the amount of data that can be entered into the computer. In the last few years, however, microphones and video cameras have begun to be shipped with new computers, enabling a fundamental change in how computers can perceive the world.

In modern computers, camera are becoming ubiquitous thanks in large part to the proliferation of video conferencing and imaging applications. Most video processing applications involve the capture and transmission of data. And, accordingly, most video technologies for the PC reside in codecs, conferencing, and television/media display. The amount of intelligent, semantic-based processing applied to the video stream typically is negligible. Further, there has been very little done to integrate semantic-based processing with computer operation.

There exists a need in the art for a human-machine interface that shifts away from the literal, "touch"-based input devices that have characterized computers for so long. Humans view the world associatively through visual and acoustical experience. The integration of video cameras and microphones now enable the computer to perceive their physical environments in a manner in which humans already do. Accordingly, computer that perceive their environment visually will start to bridge the perceptual gap between human beings and traditional computers.

Also, in modern computing systems, interactive displays increasingly are becoming more common. "Interactive displays" refer generally to a class of devices in which a viewer of the display may control at least a portion of information presented by the display. Display data may be organized into layers of data which are selectively activated. The interactive display, therefore, may receive layers of audiovisual data that may be displayed to a user on a selective basis. A base layer of data may include data that is continually present to a user unless obscured by metadata. Metadata refers generally to ancillary or supplementary data that a user may select for display. The form, format and content of the base layer data and metadata, of course, depends upon the applications for which the interactive display is used.

Interactive displays have broader application than the traditional PC-style of computer. In fact, some believe that PC-style of computers may converge upon traditional domestic television services, wherein television viewers may interact with programming content. Consider, by way of example, a sports broadcast. In conventional sports programming, when play focuses on a particular player, it is conventional for broadcast networks to superimpose printed statistics relating to the player's performance. An interactive display might permit a viewer to determine when (or if) to display a player's statistics through a selection and command process that resembles the "point and click" of traditional PC graphical selection techniques.

As is known, viewers favorably receive interactive display systems that are intuitive and easy to use. They will avoid any system that is cumbersome or requires excessive training before the system may be used for its intended purpose. Further, particularly in the field of television viewing, viewers will not tolerate interactive display controls that are tethered to a control console through a cable or the like. Accordingly there is a need in the art for an interactive display that is easy to use, one that does not require training or manipulation of complicated remote devices.

SUMMARY

Embodiments of the present invention provide a video overlay method that identifies a token from input video data and resolves the token's position in the input video data to a position in output video data. The method determines whether the token's resolved position implicates metadata. If so, the method includes the metadata in the output.

BRIEF DESCRIPTION OF THE DRAWINGS

FIG. 2 is a block diagram of an implementation of the present invention according to a first embodiment.

FIG. 3 is a block diagram of an implementation of the present invention according to another embodiment.

FIG. 4 is a block diagram of an implementation of the present invention according to a further embodiment.

DETAILED DESCRIPTION

Figure 1:
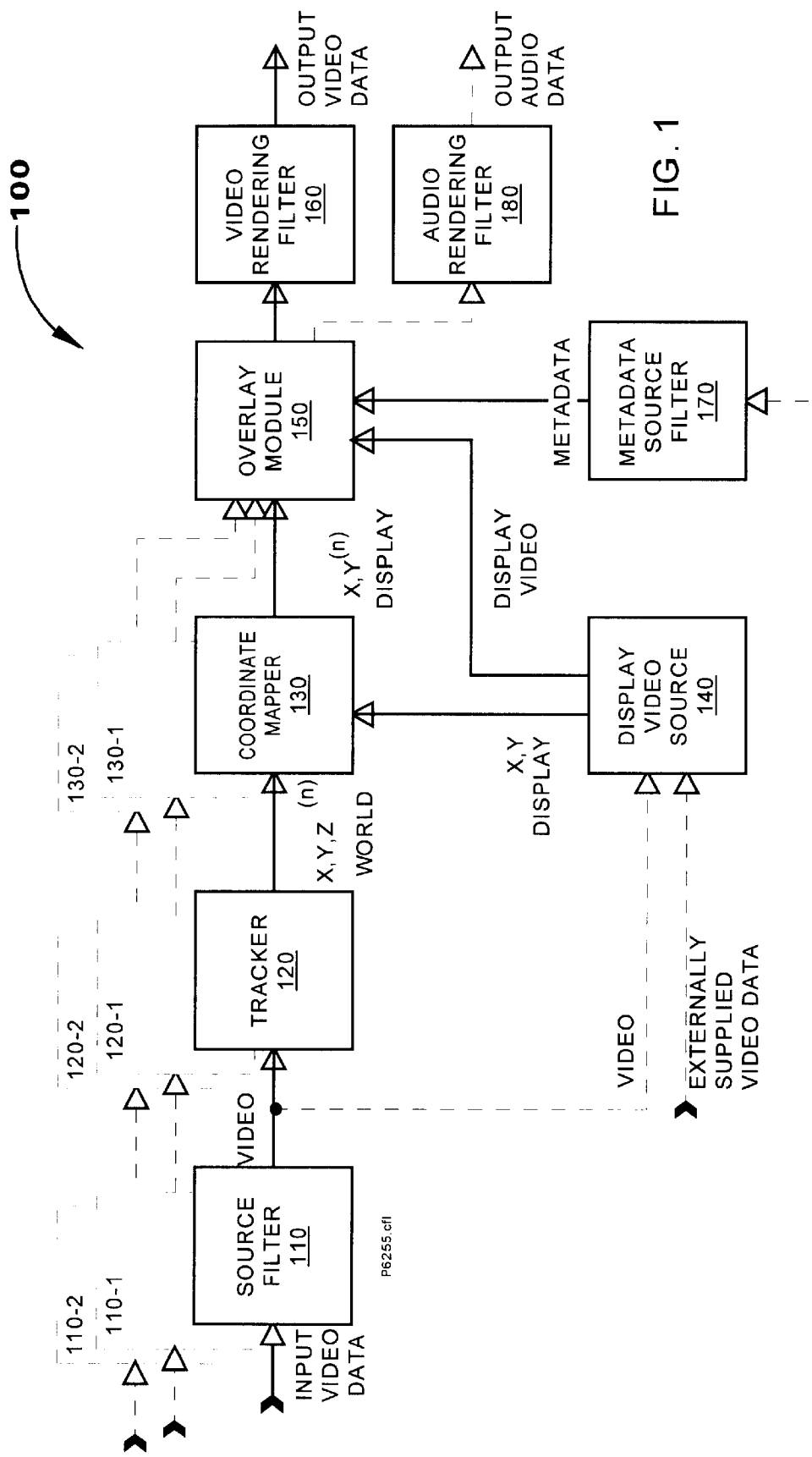
FIG. 1 illustrates a video tracking and overlay system constructed in accordance with an embodiment of the present invention.

Embodiments of the present invention provide an interactive computer system that permits a user to access metadata associated with base layer data. The user manipulates a token in free space. Captured video information of the user is input to an overlay system. The overlay system identifies the token from the captured video information and tracks it in space. The overlay system resolves a "real-world" coordinate of the token to a coordinate in a domain of the base layer data. If the token's display-domain implicates metadata, the overlay system overlays the metadata on the base layer data.

An embodiment of the present invention is illustrated in FIG. 1. There, the overlay system 100 may include a source filter 110, a tracker 120, a coordinate mapper 130, a display video source 140, an overlay module 150, a rendering filter 160 and a metadata source filter 170.

The source filter 110 receives input data from a video input device (not shown). The input data may be still image data or temporal, moving video data. The source filter 110 may be provided directly connected to the video input device. In such an embodiment the source filter 110 may include software drivers for the video input device. Alternatively, the source filter 110 may receive input data through a communication channel provided by a telecommunication or computer network (also not shown). In this alternate embodiment, the source filter 110 includes communication interface hardware and/or software as may be required to interface the overlay system 100 to the network. The source filter 110 outputs video data.

The video data output from the source filter 110 is input to the tracker 120. The tracker 120 identifies a token from the input video data and associates a coordinate to it in the domain of the input video data. The coordinate identifies the token's location in the input video data from which it was identified. The tracker 120 outputs the token's coordinate to the coordinate mapper 130.

According to an embodiment, the tracker 120 may be configured to recognize and distinguish multiple tokens. The tracker 120 also may be configured to output a code representing a token type. For example, in one application, it is envisioned that a lighted wand may be used as a token, a wand that can be controlled to emit light of multiple colors. The tracker 120 may be configured to discriminate among the different colors and output a code representative of the color that is identified (in this example). Of course, a variety of tokens are applicable with the present invention.

Tracking and object recognition are known per se. The tracker 120 of the present invention may perform tracking and recognition according to any of a number of different processes, including the techniques shown in:

"Real-Time Hand Tracking and Gesture Recognition Using Smart Snakes"—Tony Heap and Ferdinando Samaria of Olivetti Research Limited.

"A Generic System for Image interpretation using flexible templates", A. F. Hill, T. F. Cootes, and C. J. Taylor, Proc. British Machine Vision Conference.

"Local Correlation measures for motion analysis: a comparative study." P. J. Burt, C. Yen, and X. Xu, IEEE CPRIP.

The display video source 140 receives base layer video data. From the source filter 110 or may receive video data from another source. The display video source 140 receives video data from the source filter as the base layer video data when the application calls for metadata to be overlaid on the current active video source. The display video source 140 receives external video data as the base layer video data when the application calls for metadata to be overlaid on other visual content. The display video source 140 also may perform traditional manipulations of the input data; for example, it may subtract out a background. The display video source 140 forwards selected video data to the coordinate mapper 130.

The display source 140 may receive one or more layers of metadata from an external source in association with externally received base layer data. In such an embodiment, the display video source passes the metadata layer to the overlay module 150.

The coordinate mapper 130 may resolve coordinate data from the tracker 120 into a coordinate system of the base layer video data. The coordinate mapper 130 receives image data from the tracker 120 and the display video source 140 and calculates coordinates of the token in the domain of the display video data. In other words, the coordinate mapper 130 determines a position of the token in the base layer data based upon the token's position in the captured video. The coordinate mapper 130 outputs the display-based coordinates of the token to the overlay module 150.

Resolution of coordinates from a first video stream into coordinates from a second video stream is known per se. The coordinate mapper may perform coordinate resolution according to any number of conventional techniques.

The coordinate mapper 130, according to an embodiment, may pass token type information and other high level semantic data to the overlay module.

The overlay module 150 receives display video data, metadata and the token's display-based coordinates and generates a composite video image therefrom. The overlay module 150 determines whether the token's position coincides with the region occupied by the metadata. If so, the overlay module 150 includes the selected metadata in the composite image. The overlay module 150 outputs video data representing the composite video image.

In a second embodiment, both the token and metadata each may occupy an area. Portions of the metadata area that coincides with the area occupied by the metadata may be overlaid upon the base layer video data.

According to a further embodiment of the present invention, the overlay module 150 may determine whether a token implicates metadata with reference to type codes associated with the data. For example, the metadata itself may be associated with token code(s). In such an embodiment, the metadata would be implicated if the token's position coincided with the position of the metadata and if the token's type code agreed with the type code(s) associated with the metadata.

For example, consider the example of the colored wand described above. Metadata in a first layer may be associated with the wand when emitting a first color but not with the wand when emitting a second color. Metadata of a second layer may be associated with the wand when emitting the second color. In this embodiment, the system 100 may display metadata only when the token coincides with the metadata in both position and type.

According to yet another embodiment of the invention, the overlay module 150 may determine how much metadata to display based on the depth of the token. The tracker 120, in an embodiment, may assign a size or depth to a recognized token based upon the token's size in the image data (usually, the token's size corresponds to its depth—its distance from the camera when it is first captured as video data). The overlay module may receive a size or depth indicator from tracker 120 indirectly through the coordinate mapper 130. In this embodiment, different pieces metadata may be implicated if the token's three-dimensional position coincides with a volume occupied by the metadata in the domain of the base layer video data.

The rendering filter 160 outputs the video data from the overlay system 100. The rendering filter 160 may be provided directly connected to a video output device such as a display. In such an embodiment the rendering filter 160 may include software drivers for the video output device. Alternatively, the rendering filter 160 may output the video data through a communication channel provided by a telecommunication or computer network (also not shown). In this alternate embodiment, the rendering filter 160 includes communication interface hardware and/or software as may be required to interface the overlay system 100 to the network.

The metadata filter 170 receives metadata from a metadata source, such as a memory or a communication channel. The metadata filter 170 may format the metadata as necessary to provide the metadata in a format that may be processed by the overlay module 150.

The overlay module 150 determines whether the token implicates metadata from the metadata filter 170. In a first embodiment, metadata may be identified by spatial areas that they occupy. For example, the metadata elements may be identified by origin coordinates in the display domain and lengths and widths or, alternatively, by coordinates of opposing corners. The overlay module 150 may determine whether the token falls within the area defined for any metadata and, if so, selects the metadata to overlay the video data.

In an alternative embodiment, the overlay module 150 may define a token to occupy a predetermined area. Metadata elements also may possess an area. The overlay module 150 may determine whether any metadata area coincides with the area of a token and, if so, reveals the coincident metadata. In this alternative, the token operates as a "window." By moving the window around, a user reveals underlying metadata.

The overlay system 100 has been described herein as operating on only a single token recognized from a single stream of input data. In an embodiment, the overlay system 100 may be configured to overlay metadata on video in response to multiple tokens. In this embodiment, the tracker 120, the coordinate mapper 130 and the overlay module 150 apply the processing performed for a single token to multiple tokens.

In another embodiment, the overlay system 100 may operate on one or more tokens from several streams of video data. In this embodiment, the source filter 110, the tracker 120 the coordinate mapper 130 and the overlay module 150 each are replicated for several input video data streams. These are shown in phantom in FIG. 1 with like reference numerals using the "-1" and "-2" suffixes. Although typically the display video source 140 will not be replicated for each of the various video streams, it is conceivable that one or more of the video streams will contain the video data on which metadata will be overlaid. In this instance, video data from the one stream may be input to the display video source 140.

As is known, a processing system may be trained to recognize "tokens" of a variety of different types. Typically, a token possesses a unique shape and/or color to permit the processing system to distinguish it from other content in a captured video data stream. For example, a simple token simply may be a colored object having a predetermined shape, such as a red circle. Tokens may include predetermined symbols, Indeed, processing systems have recognized and tracked a user's fingertip as a token. The principles of the present invention find application with any type of token that may be recognized and tracked by a processing system.

In an embodiment, the tracker 120 may track tokens according to fuzzy processing. As is known, when humans hold objects in their hands, they exhibit slight tremors or shakes. The object is not perfectly steady. The shakes would cause the token to move slightly despite a user's intent to hold the token still. Further, camera equipment is likely to be mounted on equipment that exhibits its own shake. Fuzzy processing may be employed in the tracker 120 to reduce or eliminate the effects of such shaking. As an exemplary technique, alpha blending may be used to accomplish such fuzzy processing.

The above description of the overlay system 100 has presupposed that the metadata is exclusively video data. However, the principles of the present invention are suitable for use with metadata that is entirely video, entirely audio or has a hybrid audio-visual content. According to an embodiment of the present invention, the overlay system 100 may include an audio rendering filter 180 that drives audio devices (not shown). Audio components of selected metadata may be output via the audio rendering filter 180. In this embodiment, non-metadata audio data may be input either to the overlay module 150 or the audio rendering filter 180 (input not shown).

The overlay system 100 shown in FIG. 1 may be implemented in hardware or software. In a hardware embodiment, FIG. 1 represents hardware elements that may be provided in an integrated circuit such as an application specific processor. In a software embodiment, FIG. 1 represents functional processes that may be performed in a general purpose processor or a digital signal processor.

According to an embodiment, the overlay system 100 may be made "depth sensitive." As shown in FIG. 1, the token is resolved into x, y coordinates representing the token's position in the various domains. The overlay system 100 optionally may determine a z coordinate representing a depth of the token.

As is known, the tracker 120 is trained to recognize the token. The tracker 120 may be trained as to the token's shape and/or color and also to its size. Based on the size of the token in the captured video stream output from the source filter 110, the tracker 120 may determine a distance of the token from the video input device. The tracker 120 outputs the token's distance coordinate to the coordinate mappers 130. The coordinate mapper 130 maps the token's distance coordinate to the display coordinate system. The overlay system retrieves associated metadata and, if any, uses the depth information to overlay it on the display.

In another embodiment, the tracker 120 module may output additional information related to a token. For example, the token's orientation may be represented by three degrees of rotation. Again, the tracker 120 may recognize and represent various attributes of the token, such as its color, and/or pattern size. For example, a square token may include predetermined patterns that can be used to distinguish one token type from another. It also is foreseeable that the "tokens" will not be objects at all but rather will be a user's hand. In such an example, the user's hand to may be arranged in various gestures which may identify different token types. This can be fed to the overlay module 150 to control which metadata is revealed.

Depth-sensitive overlay systems may provide enhanced functionality. Metadata may be arranged into layers, each having a depth. Consider an application where the present invention is to illustrate major organs of the human body. As is known, the rib cage encloses the heart, lungs, liver and other organs of the digestive tract. The rib cage is covered by exterior muscles in both front and back. From a two dimensional representation of a token, it may not be known whether the user selects the heart, lungs, liver or some muscle. By having the metadata indexed based on the depth of the token, the depth of the token may be used to select among co-located metadata.

In an embodiment, the overlay module 150 also may overlay an icon on the video data identifying the token's position in the display domain. The icon may function as a cursor in many does traditional graphical user interfaces modern computing applications providing feedback to the user.

FIG. 2 illustrates a system 200 constructed in accordance with an embodiment of the present invention. The system 200 includes a processor 210, a video input device 220, a display 230 and a receiver 240. The video input device 220 may be any of a number of devices that capture visual information and represent the visual information as an electrical signal. The devices 220 may include analog and digital video cameras. Similarly, the display may be any of a number of video output devices that generate visual displays from an electrical video signal. The displays 230 may include monitors, television displays, flat panel displays, projection display systems and the like.

In the embodiment of FIG. 2, video data and metadata may be received from a network over a communication channel such as those created by radio frequency or computer networks. The receiver 240 receives the channel and retrieves the video data and metadata therefrom according to the modulation and encoding techniques used for the channel. The receiver 240 provides the video data and metadata to the processor 210.

The processor 210 is configured to operate according to the principles of the overlay system 100 of FIG. 1. It tracks a token controlled by a user and overlays any metadata selected by the user over the video data received from the channel.

The system 200 of FIG. 2 permits a user to interact with broadcast video such as a television program. One application may be used for application to a sports broadcast. As is known, it is common in most sport to accumulate statistics representing players' performances over the course of a game or a season. When play focuses on a particular player, it is common to broadcast the player's statistics with the player. According to the present invention, the statistics may be maintained in metadata and transmitted with video data. By manipulating tokens, users may display the statistics of one or more players. The system 200 of FIG. 2 is appropriate for general use and is not limited to any sort of video content.

FIG. 3 illustrates another system 300 constructed in accordance with an embodiment of the present invention. The system 300 includes a general purpose computer 310, a video input device 320 and a display 330. The computer 310 includes video store 340.

The video input device 320 is a camera such as those describe herein. Similarly, the display 330 is a video output device such as those described herein.

In this embodiment, the video store 340 stores both the video display data and the metadata. The video store may be an electrical, magnetic or optical storage medium. Computer 320 is provided with an information retrieval system (not shown) as necessary to retrieve information stored in the video store 340.

The system 300 of the embodiment of FIG. 3 permits a user to interact with prestored video content. Although the video content to be displayed is static, it may be displayed in a predefined or dynamic order. For example, the video content may represent a film to be displayed in a convention video application (i.e. digital video disc, VHS tape or other manner). In this case, the film typically is displayed from start to finish. The system 300, however, permits a user to interact with the information content by selecting and displaying metadata that may be provided in association with parts of the film.

Alternatively, the video content may represent a video game such as those commonly provided on magnetic disk or CD-ROM. In this case, a user's conduct may determine the presentation of content from the video store 340. Even in this embodiment, the system 300 permits a user to select a portion of the video content and display metadata that may be associated therewith.

FIG. 4 illustrates yet another system 400 constructed in accordance with an embodiment of the present invention. There, the system includes a computer network 410, a plurality of video input devices 420.1–420.2, a plurality of displays 430.1–430.3 and a server 440. The computer network 410 operates according to a network protocol that permits one component connected to the network 410 to transmit to another component connected to the network 410 according to a network address. The video input devices 420.1–420.2 and displays 430.1–430.3 are connected to the network 410 via interface devices (not shown) that operate according to the network protocol.

Again, the video input devices 410.1–410.2 may be any of the devices described herein. The displays 420.1–420.3 also may be video output devices as described herein.

The server 440 may be configured to operate according to the principles of the overlay system 100 of FIG. 1. It receives video data input from the video input devices 420.1–420.2 and identifies and tracks tokens contained therein. Based on the tracked tokens, the server 440 may overlay any metadata selected by the tokens on video data. The video data and metadata may be stored locally at the server 440 or may be obtained from another network component (not shown). In either case, the server 440 generates video output data. The server 440 transmits the video output data to one or more displays 430.1–430.3.

In this embodiment, a plurality of users may control display data over a network. Again, the users manipulate tokens before a camera. The cameras may or may not be co-located with the displays. Metadata selected by a user may be transmitted to a plurality of users over a network.

In the various embodiments described herein, users interact with the overlay system "hands free." That is, users manipulate tokens in free space without having to remain co-located with traditional input devices such as keyboards or mice. To supplement the features of the present invention, however, the overlay system may accept inputs from such traditional input devices.

Accordingly, the present invention provides an interactive overlay system in which users may manipulate tokens and thereby gain access to metadata.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A video overlay system, comprising:
   a tracker that receives captured video data and identifies a position of a token therefrom,
   a coordinate mapper receiving the captured video data domain position of the token and base layer video data and determining the token's position in a domain of the base layer video data, and
   an overlay module receiving the base layer video data, metadata and the token's base-layer-domain position and overlaying the metadata on the base layer data if the token's base-layer-domain position coincides with the metadata's base-layer-domain position.

2. The video overlay system of claim 1, wherein the captured video data is the base layer video data.

3. The video overlay system of claim 1, wherein the system receives the base layer video data and a layer of metadata in a unitary layered signal.

4. The video overlay system of claim 1, further comprising a memory storing the metadata.

5. The video overlay system of claim 1, wherein the tracker further identifies tokens by token type.

6. The video overlay system of claim 5, wherein the metadata is associated with a token type, and the overlay module overlays metadata upon base layer data when the detected token type agrees with the token type associated with the metadata.

7. A method of overlaying metadata on video data, comprising:
   identifying a token from input video data,
   resolving the token's position in the input video data to a position in output video data,
   determining whether the token's resolved position implicates metadata, if so, outputting the implicated metadata.

8. The method of claim 7, wherein the outputting step includes overlaying metadata on output video data.

9. The method of claim 7, wherein the identifying step identifies multiple tokens and the resolving, determining and overlaying steps are repeated for each of the identified tokens.

10. The method of claim 7, wherein the identifying step is repeated upon multiple input video data and the resolving, determining and overlaying steps are repeated for each token identified thereby.

11. The method of claim 7, wherein the resolving step includes determining coordinates for the token in a domain of the input video data, generating a coordinate system from the output video data, and mapping the token to the coordinate system.

12. The method of claim 7, wherein the resolving step includes determining a depth of the token.

13. The method of claim 7, wherein metadata occupies an area of the output video data and the determining step determines whether the token falls within the area of any metadata.

14. The method of claim 7, wherein metadata are defined by coordinates, and the determining step comprises defining a area occupied by the token, and determining metadata to be implicated if the coordinates fall within the area of the token.

15. A computer readable memory containing program instructions that, when executed by a processor, cause the processor to:

identify a token from input video data, resolve the token's coordinates in a domain of output video data from a domain of input data, determine whether the token's coordinates implicate metadata, and if so, to overlay the implicated metadata or the output video data.

16. A video data signal constructed according to the process of:

identifying a token from input video data, resolving the token's coordinates in a domain of output video data from a domain of input data, determining whether the token's coordinates implicate metadata, if so, overlaying the implicated metadata or the output video data.

* * * * *